INVENTORS
JOHN KAUFMANN
HAROLD R. DELL
BY Edward A. Robinson
Attorney

INVENTORS
JOHN KAUFMANN
HAROLD R. DELL
BY
Edward A. Robinson
attorney

INVENTORS
JOHN KAUFMANN
HAROLD R. DELL
BY Edward A. Robinson
attorney

INVENTORS
JOHN KAUFMANN
HAROLD R. DELL
BY Edward A. Robinson
Attorney

United States Patent Office 3,247,365

Patented Apr. 19, 1966

3,247,365

DIGITAL FUNCTION GENERATOR INCLUDING SIMULTANEOUS MULTIPLICATION AND DIVISION

Harold R. Dell, Palo Alto, and John Kaufmann, Sunnyvale, Calif., assignors to General Precision, Inc., Binghamton, N.Y., a corporation of Delaware Filed Feb. 6, 1961, Ser. No. 87,337

4 Claims. (Cl. 235—164)

This invention relates to electronic computers, and more particularly, to circuits for obtaining output signals representative of the values of predetermined functions of quantities represented by input signals.

Computing circuits may be generally classified in two basic types—analog and digital. In an analog circuit there is a direct correspondence or an "analogy" between the quantities undergoing calculations and certain electrical quantities, usually voltages, which will exist at points in the circuit. In a digital circuit, data is represented by coded combinations of signals which may exist in a finite number (usually only two) of discrete quantities. While analog signals may be passed through computation systems extremely fast, the degree of accuracy obtainable for these analog signals is limited by the character and quality of the circuit components. Ordinarily analog computers may be designed for accuracy of .1% or one part in a thousand. If greater accuracy is desired from an analog computer considerable expense must be incurred to improve the quality and design of the circuit. Digital computers, on the other hand, may perform computations with any desired degree of accuracy, but digital machines may be considerably slower in operation than analog circuits.

In certain computer applications such as aircraft simulators, it may be necessary to develop an output signal corresponding to a quantity such as the thrust of an engine, when given certain input signals which may be representative of quantities such as fuel intake, Mach number, ambient temperature and pressure etc. Generation of such a function dependent upon one or two variables may be accomplished by analog means, but with limited accuracy. If greater accuracy is desired, a function generation arrangement must be provided which is digital rather than analog. If it is necessary to generate a function of three or more variables, an analog approach will become very difficult.

To generate functions digitally, data representative of various curves of the functions may be stored point by point in a memory device such as a magnetic drum. The desired function may then be reproduced from the drum, and the point most nearly approximating the independent quantity represented by the input signal may be reproduced as the output signal. However, drum storage capacity is ordinarily limited, and therefore, data for a limited number of points may be stored to represent a function curve. In all probability the independent input quantity would not coincide with a specifically recorded point, but will be a value intermediate between two points. To obtain an accurate output signal, a computation must be performed interpolating between the two recorded points of the pre-determined function curve which points bracket the input quantity. For each of the points reproduced from the pre-determined function curve, a value of the independent variable, $x$, and a corresponding value of the dependent variable, $f(x)$, will be used. If the independent input quantity, $x$, lies between and is bracketed by points $x_A$ and $x_B$, the desired output function $f(x)$ may be computed from the formula:

$$f(x)=\frac{x-x_A}{x_B-x_A}[f(x_B)-f(x_A)]+f(x_A)$$

where $f(x_A)$ and $f(x_B)$ are the function values from the curve corresponding to the values $x_A$ and $x_B$ of the independent variable.

When appropriate input quantities are substituted into the above formula, the computation requires three initial subtractions, a multiplication, a division, and a final addition. All of these arithmetic operations may be accomplished by adders having appropriate input gating circuits and having registers or other storage means for retaining the input quantities and intermediately derived quantities. The initial subtractions may be performed by complementing certain of the input quantities and adding one quantity in complemented form to another quantity in true form. The subtraction and addition steps may be performed by a single pass of the quantities through the adder to obtain an appropriate difference and sum signals. However, a multiplication requires successive additions and shift operations of a multiplicand quantity, and therefore, the multiplicand and successive partial products must be passed through an adder repeatedly as many times as there are digits in the multiplier quantity. Thus, if two twelve digit numbers are multiplied together, at least twelve additions or passes through the adder will be required. Similarly, a division is accomplished by repeated subtractions and shift operations of the divisor. Therefore, a division operation requires that the divisor quantity and a dividend quantity be passed through the adder a number of times corresponding to the number of digits of the divisor. Obviously, the time and number of operations required for a solution of the above interpolation formula is principally dependent upon the time required for the multiplication and the division operations which necessitate the repeated passes through the adder since the addition and subtractions may be performed relatively fast with but two or three passes. Heretofore, arithmetic operations such as multiplication and division have been performed independently, and the second step could not be commenced until the first step was completed—prolonging the overall operation.

It is an object of this invention to provide improved apparatus for generating output signals representative of quantities which are a pre-determined mathematical or empirical function of independent quantities represented by input signals, and more specifically, it is an object to provide a rapid digital system which will have greater accuracy than analog systems presently in use.

A further object of this invention is to provide an improved function generation system wherein recorded data is reproduced point by point defining a function curve, and wherein an input quantity is compared to the recorded values of an independent variable of each successive curve point to obtain two bracketing values (one less than and one greater than the input value) and wherein an interpolation is performed to obtain an output quantity representative of a value of a dependent variable corresponding to the input signal.

Another object of this invention is to provide improved arithmetic apparatus for solving the interpolation formula:

$$f(x)=\frac{x-x_A}{x_B-x_A}[f(x_B)-f(x_A)]+f(x_A)$$

and more specifically it is an object to provide a method and means for combining steps of division and multiplication such that the overall time required for the combined steps is substantially the same as that time required for each of the steps individually.

Numerous other objects and advantages will be apparent throughout the progress of the specification which follows. The accompanying drawings illustrate a certain selected embodiment of the invention and the views therein are as follows.

Figure 1:
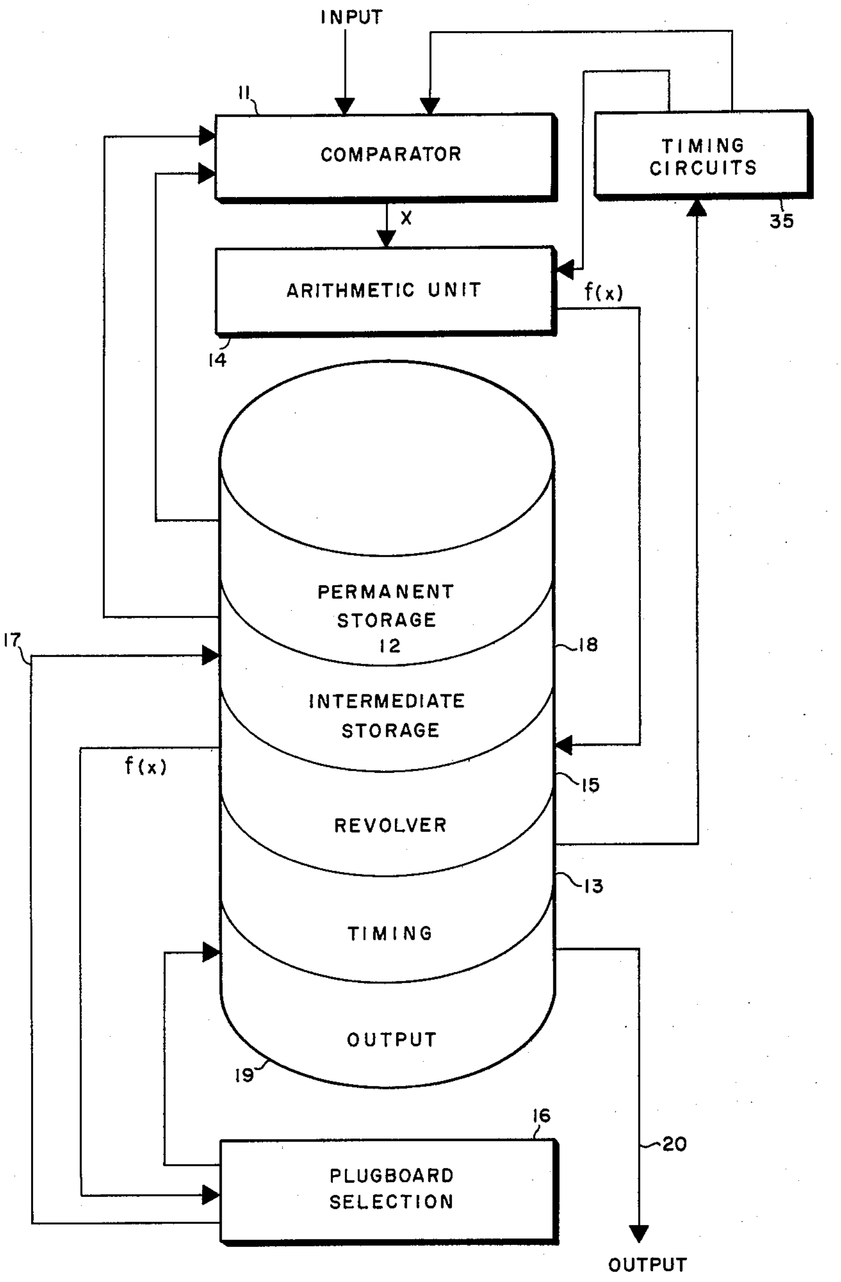
FIGURE 1 is a schematic diagram of a computer for digitally generating functions in accordance with this invention.

Briefly stated with reference to FIGURE 1, according to this invention, a digital input signal, $x$, representing a value for an independent variable is impressed upon a comparator circuit 11 and is compared therein with successive values $x_1$, $x_2$, $x_3$, etc. representing values of an independent variable at successive points along a function curve and reproduced from a storage section 12 of a magnetic drum storage device 13. Each successive value $x_1$, $x_2$, $x_3$, etc. is compared with the $x$ input until a value appears which exceeds the input $x$, whereupon the two points from permanent storage which bracket the $x$ value (one being larger than, and the other being smaller than the input $x$) are passed to an arithmetic unit 14. The data passed from the comparator 11 to the arithmetic unit 14 includes the $x$ input, the two bracketing values of the independent variable, $x_A$ and $x_B$, and two corresponding values of the function of that variable $f(x_A)$ and $f(x_B)$. An output value, $f(x)$, from arithmetic unit 14 may be passed to a revolver storage section 15 of the drum 13 and thence to a plug board of semi-permanent connections 16. If the value $f(x)$ constitutes an intermediate interpolation of a function of two or more variables, it may be passed via a lead 17 to an intermediate storage section 18 of the drum 13, and may thence become a stored point for another function from which a further interpolation will be made by the comparator 11 and the arithmetic unit 14. On the other hand, if the value $f(x)$ constitutes a final output it may be passed to an output section 19 of the drum 13 and thence to an output circuit 20.

Figure 5:
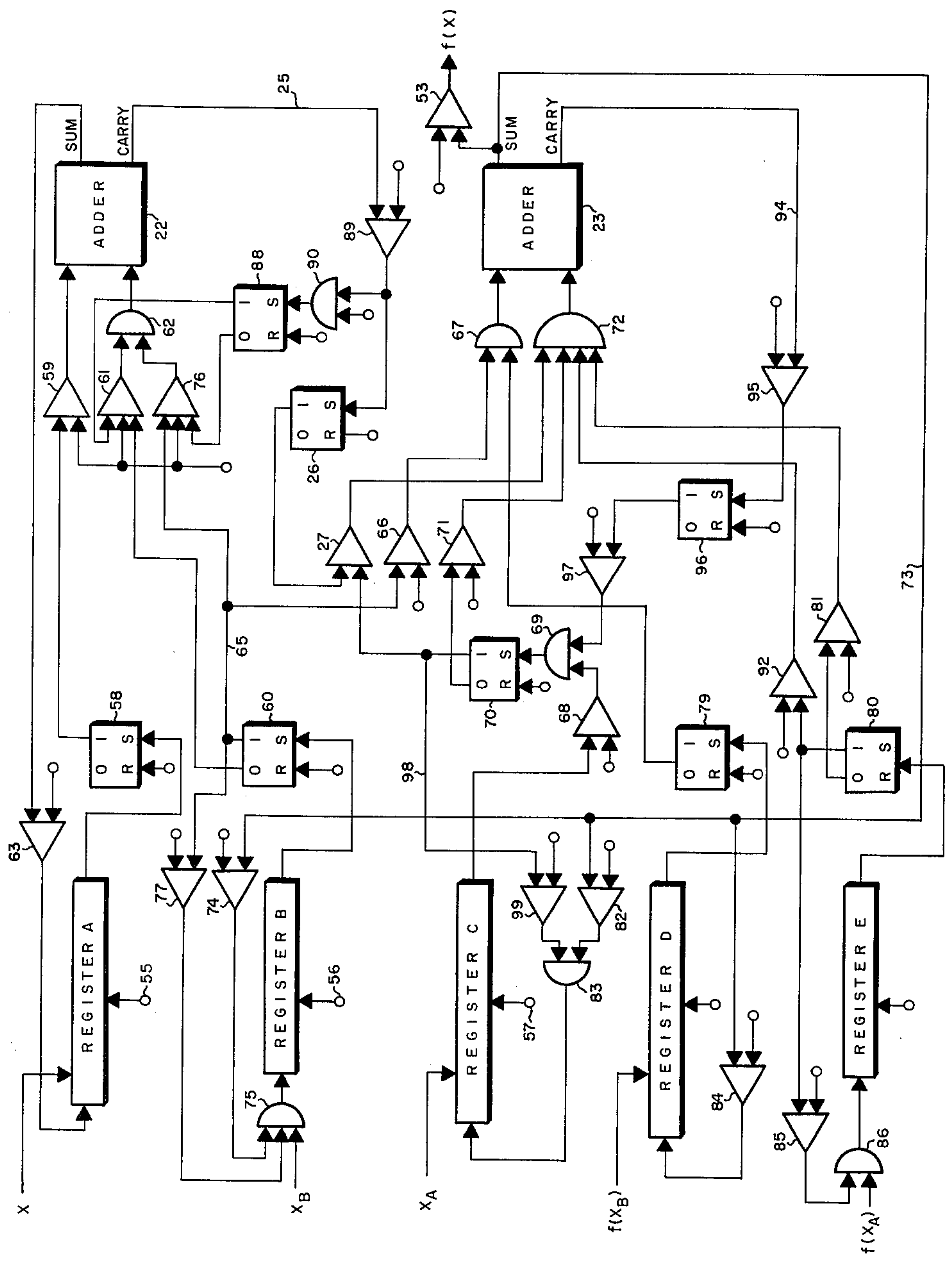
FIGURE 5 is a schematic diagram of an arithmetic unit represented as a block in FIGURE 1.

Referring briefly to FIGURE 5, the interpolation computation is performed upon the quantities $x$, $x_A$, $x_B$, $f(x_A)$ and $f(x_B)$ which are initially entered into registers A, B, C, D and E respectively. In a first sub-cycle of operation a first adder 22 receives the input quantity $x$ in true form and the quantity $x_B$ in complemented form whereupon a subtraction is performed and the quantity $(x-x_B)$ is stored in the register A. Simultaneously, in the first sub-cycle of operation a second adder 23 receives the quantity $x_B$ in true form and the quantity $x_A$ in complemented form whereupon a subtraction is performed and the quantity $(x_B-x_A)$ is stored in the register B. During a second sub-cycle of operation, the adder 22 performs a first of several repetitive steps of a division process wherein the quantity $(x-x_A)$ is divided by the quantity $(x_B-x_A)$. Simultaneously, during the second sub-cycle of operation the adder 23 receives the quantity $f(x_B)$ in true form and the quantity $f(x_A)$ in complemented form whereupon the subtraction is performed to derive a quantity $[f(x_B)-f(x_A)]$ which is stored in the register C and will become the multiplicand in the multiplication operation. After each step of the division process, the presence of a carry signal appearing on a lead 25 will indicate a binary "1" as a quotient digit which will become the multiplier in the next successive operation. By providing that the multiplication will be performed most significant digit of the multiplier first, the binary "1" on the lead 25 will set a flip-flop 26 which will condition a gate 27 to pass the multiplicand from the register C to be added as a partial product by the adder 23 and stored in the register D. Obviously, if no carry signal appeared upon the lead 25, the gate 27 will block signals from the register C and the multiplicand will not be added as a partial product; or in effect, a multiplication by zero is performed such that the partial product of zero will be added into the product register. Thus, the circuit of FIGURE 5 provides a method and means for combined division and multiplication wherein the most significant digit of the multiplier is used first, and is used directly upon generation from the division operation. By combining the division and multiplication operations, a time saving is effected since one operation need not be completed before the other operation is commenced.

Figure 4:
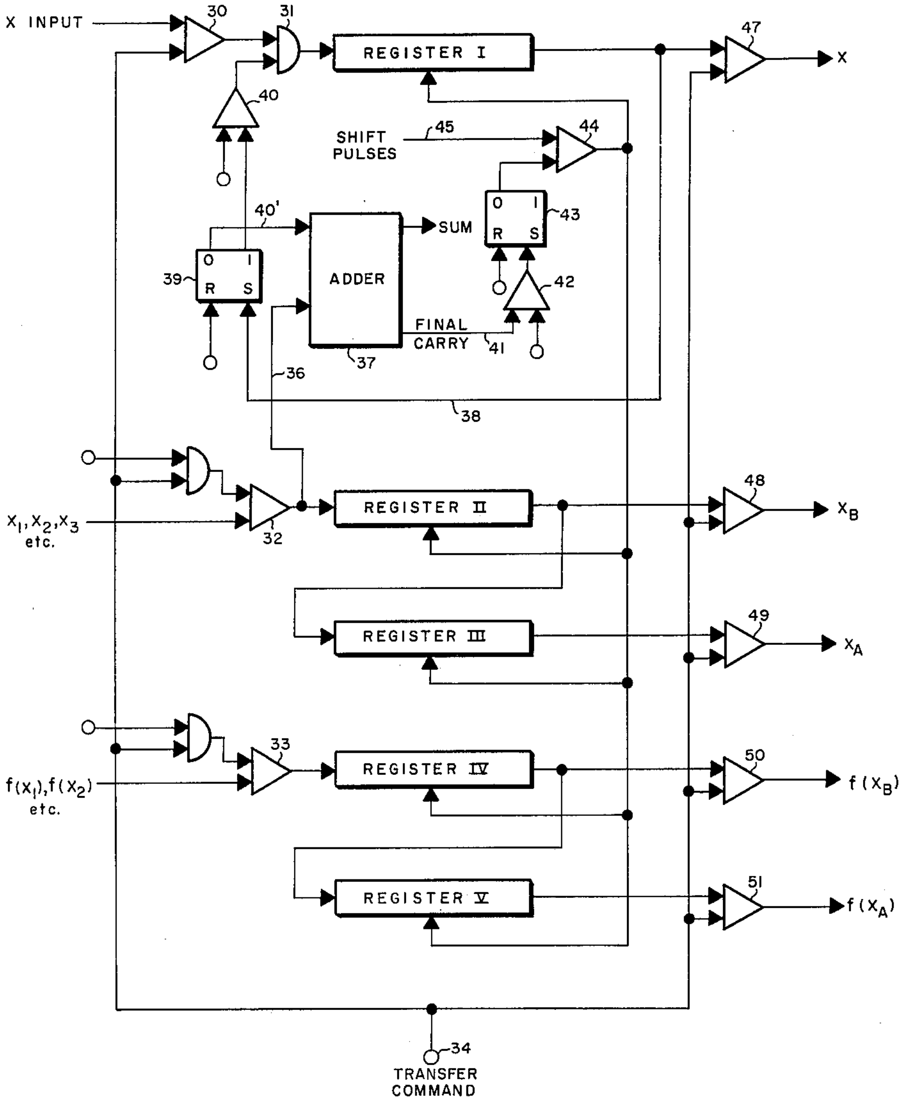
FIGURE 4 is a schematic diagram of a comparator circuit illustrated as a block in FIGURE 1.

FIGURES 4 and 5 show the use of certain logic and arithmetic circuits heretofore known in the art. AND gates and OR gates are shown by triangular blocks and semi-circular blocks respectively, and each includes two or more input leads with a single output lead. A voltage will appear at the output lead of an AND gate when appropriate conditioning voltages are impressed on all of the input leads. A voltage will appear at the output lead of an OR gate when an appropriate voltage is impressed upon any of the various input leads. Examples of AND and OR gates are shown and described on page 54 of a textbook entitled "Digital Computer Components and Circuits" by R. K. Richards published in 1957 by the D. Van Nostrand Company, Inc. FIGURES 4 and 5 illustrate the use of bistable circuits or flip-flops also known in the art as trigger circuits. A flip-flop circuit has two stable conduction states, and it may be changed from one state to the other by the application of a voltage pulse to an input "set" or "reset" terminal. Such a circuit is shown and described on page 71 of the Richards book, supra. FIGURES 4 and 5 illustrate shift registers which may be a combination of flip-flops or alternatively may be a combination of magnetic cores; for example, see page 192 of the Richards text supra. FIGURES 4 and 5 also illustrate the use of binary adders which may generate appropriate "sum" and "carry" signals from a pair of input signals. An example of an adder circuit is shown on page 169 of the Richards book, supra. FIGURE 1 illustrates the use of a magnetic drum 13 which is known in the art as a large capacity storage device. Of the various sections of the magnetic drum 13, one section provides a revolver unit for collecting and storing data piecemeal and thence passing the collected data as a whole. An example of a revolver is shown and described on page 297 of the Richards book, supra. FIGURE 1 indicates timing circuits 35 operated from a clock section of the drum. This circuitry may include conventional flip-flops and the like which are triggered by clock pulses from the drum 13 and provide timing for the circuits of FIGURES 4 and 5.

Figure 2:
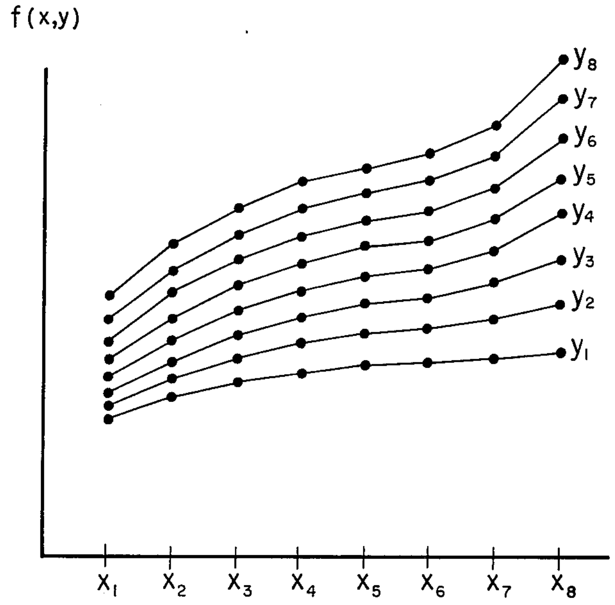
FIGURE 2 is a graphical representation of a function of two variables which may be stored as point by point data in a magnetic drum or other data storage device.
Figure 3:
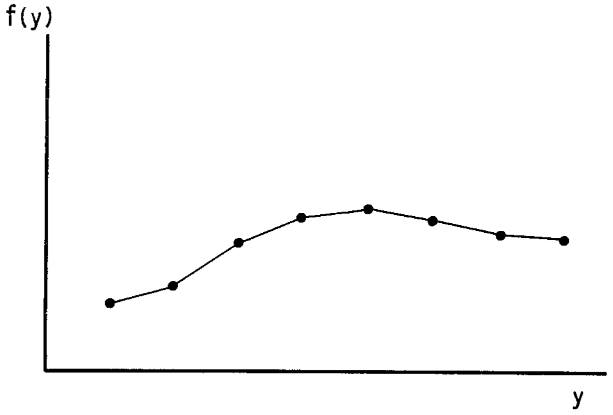
FIGURE 3 is a further graphical representation of a function of a single variable which may be derived from successive interpolations of a family of curves as in FIGURE 2.

As indicated heretofore with regard to FIGURE 1, the comparator circuit 11 receives data in the form of binary signals which define successive points of curves similar to those shown in FIGURES 2 and 3. From the storage sections 12 or 18 successive binary words defining the points of each curve will be passed in sequence to the comparator. Each word will contain identifying information, a binary signal representative of the independent variable, $x_n$, of each successive point along the curve and another binary signal representative of the value of each successive dependent variable $f(x_n)$ corresponding to the points along the curve. The points are recorded in succession such that $x_1$ is of the least value and the successive values $x_2$, $x_3$ etc. increase. The input signal is successively compared with $x_2$, $x_3$, $x_4$ etc.—$x$ must be greater than $x_1$ and no comparison need be made with respect to $x_1$. Each comparison is made with the input value $x$ until the compared value $x_n$ is found to exceed the value of $x$, whereupon $x_n$ and $(x_{n-1})$ are known to be the bracketing values of $x$ and are preserved together with the corresponding values of the dependent variable $f(x_n)$ and $f(x_{n-1})$. Interpolation may then be made by the arithmetic unit 14, and the interpolated value stored in the revolver 15. Hereinafter the bracketing values of $x$ will be known as $x_A$ and $x_B$ and the corresponding values of the dependent variable will be known as $f(x_A)$ and $f(x_B)$. Obviously, $$x_A \leqq x < x_B$$

If it is desired to determine the value of a function of two independent variables $f(x, y)$ from two separate input quantities $x$ and $y$, the interpolation may be done with respect to one variable $x$ to obtain points for another curve representative of a single variable $y$. Thus, with a given value of $x$, an interpolation may be made successively with respect to a family of curves $y_1$, $y_2$, $y_3$, etc. as shown in FIGURE 2. For each curve a new independent variable $f(y)$ is stored in the revolver 15. When the complete family of curves has been interpolated, all of the various values of $f(y)$ will fill the revolver 15 and may then be passed through the plug board section 16 via the lead 17 to the intermediate storage section 18. Thus, it may be appreciated that a family of 8 curves of two independent variables each having 8 points as shown in FIGURE 2 may be reduced by the successive interpolations to a new curve of a single variable as shown in FIGURE 3. The new curve may thence be passed from the intermediate storage section 18 to the comparator 11 and the arithmetic unit 14 to provide a final interpolation and an output value based on both independent variables. This process may be extended to further families of curves in three or more variables. The successive interpolation of the families of curves will result in further curves being placed in the intermediate storage section 18 for further interpolation. Thus, each set of interpolation operations will result in a reduction in the number of curves ultimately leading to a final value corresponding to the various independent variables.

The operation of the comparator circuit 11 may be understood with reference to FIGURE 4. In an initial step, an input signal $x$ is passed through an AND gate 30, an OR gate 31 and is stored in a shaft register I. Simultaneously, the first of the values of the independent variable $x_1$ (representative of the first point on the curve) is passed through an AND gate 32 and is stored in a shift register II. Also simultaneously, a value of the dependent variable $f(x_1)$ representative of the initial point of the curve is passed through an AND gate 33 and is stored in a register IV. By definition the $x$ input must not be less than the value of the first point $x_1$, and therefore no comparison is made during the initial transfer operation. During this initial operation the AND gates 30, 32 and 33 are supplied with an appropriate voltage by a transfer command signal from a terminal 34 originating in timing circuits 35 (see FIGURE 1).

Upon the next sub-cycle after the initial transfer operation, a new value of the independent variable $x_2$ and of the dependent variable $f(x_2)$ are passed through the AND gates 32 and 33 to be stored in the registers II and IV. Simultaneously, the signal representative of $x_2$ is passed via a lead 36 to an adder 37. During this same time, the $x$ input previously stored in the register I is circulated via a lead 38, a flip-flop 39, an AND gate 40 and the OR gate 31 returning to the input of the register I. A complemented form of the $x$ input is passed from the trigger 39 via a lead 40′ to the adder 37 to be added with the true form of $x_2$ from the lead 36. The adder 37 compares the relative values of the $x$ input and the $x_2$ value. If the $x$ input is greater than $x_2$ then no final carry will appear on a lead 41 from the adder 37 and the comparison process will continue into the next step.

In the next step the $x$ input is compared with the value of $x_3$ by the adder 37 which combines the complemented form of the $x$ input with the true form of $x_3$. If it is determined that $x_3$ exceeds the value of $x$, then a final carry will be generated on the lead 41, will pass an AND gate 42 and will set a flip-flop 43. With the flip-flop 43 set, a conditioning voltage is eliminated from an AND gate 44, and timing shift pulses from a lead 45 will thenceforth be blocked. The shift pulses from the lead 45 normally perform the function of shifting all of the registers I, II, III, IV and V and therefore, with the interruption of the shift pulses, the registers will remain static.

A register III is coupled to receive the output signal from the register II, and therefore, during the first comparison operation the value $x_2$ was being entered into the register II and simultaneously the value $x_1$ was being transferred from the register II to the register III. During the next successive comparison operation, $x_3$ was entered into the register II and $x_2$ was transferred from the register II to the register III etc. Thus, continuing our previous example, if the adder 37 determined that the value of $x_3$ exceeded the $x$ input, at that point the shift pulses were interrupted locking the bracketing values $x_3$ and $x_2$ in the two registers II and III respectively. During the same interval of time the register IV received successive values of the dependent variables $f(x_1$, $f(x_2)$, $f(x_3)$ etc. and with each successive operation a register V received the value of the dependent variable previously stored in the register IV. With the interruption of shift pulses the registers IV and V were locked with the appropriate values of the bracketing dependent variables.

Upon completion of the cycle, a transfer command voltage will be applied to the terminal 34 from the timing circuits and a group of AND gates 47, 48, 49, 50 and 51 will be conditioned to pass the outputs from the registers I through V to the various output terminals $x$, $x_B$, $x_A$, $f(x_B)$ and $f(x_A)$. At this time, the flip-flop 43 will be reset and shift pulses will pass through the AND gate 44 to all registers. Simultaneously, new information will be received through the AND gates 30, 32 and 33 for the next successive comparison while the five output leads $x$, $x_B$, $x_A$, $f(x_B)$ and $f(x_A)$ will pass signals to the arithmetic unit 14.

The five output leads of FIGURE 4 constitute the input leads for arithmetic unit of FIGURE 5, and during the initial transfer operation the contents of the registers I, II, III, IV and V of FIGURE 4 are transferred to respective registers A, B, C, D and E. The interpolation operation is performed by the arithmetic unit of FIGURE 5 in three major steps. In the first step the adders 22 and 23 perform two subtractions simultaneously; in the second major step the adder 22 performs a division while the adder 23 performs a third subtraction and then performs a multiplication; and in the final step, an addition is performed by the adder 23 and the signal $f(x)$ is passed to an output lead through an AND gate 53. The final step involving the addition constitutes the next transfer operation in which further data is transferred from the registers I through V of FIGURE 4 to the registers A through E of FIGURE 5. The second major step involving the simultaneous division and multiplication by the respective adders 22 and 23, is actually accomplished in a series of sub-cycles wherein sequential digits of the quotient are developed by the adder 22 and selective additions of the multiplicand are made as partial products by the adder 23.

During the first step of interpolation, clock pulses or timed shift pulses are applied to the registers A, B and C through terminals 55, 56 and 57. With each clock pulse, the data will shift along the registers and a final bit or digit signal will appear at the output terminal of the registers. Each successive digit signal representative of a binary "1" from the register A will selectively set a flip-flop circuit 58 which will pass a voltage level through an AND gate 59 to a first input lead of the adder 22, and simultaneously each successive digit from the register B will selectively set a flip-flop circuit 60 which may pass a complemented signal from an "0" output terminal through an AND 61 and an OR gate 62 to the second input lead of the adder 22. Effectively, the value $x_B$ is subtracted from the value $x$ which will produce a negative sum output from the adder 22. This amounts to taking the difference $x_B - x$, and then complementing this value.

The complemented form of this subtraction is passed from the sum lead from the adder 22 through an AND gate 63 to the input of the register A. Therefore, after the first subtraction operation the register A stores the difference $x_B-x$ in complemented form.

The AND gates 59 and 61 as well as further gates and flip-flop circuits of FIGURES 4 and 5 are conditioned to pass signals and are set or reset at appropriate times during each cycle of operation by signals from the timing circuits 35. To avoid confusing FIGURES 4 and 5 with many leads connecting with the timing circuitry, circuit components requiring timing signals are connected to small circular terminals which will be understood to receive appropriate timing signals.

It may be noted that the initial input $x$ was supplied to the register A at a point intermediate from the true input end. In other words, the register A was intentionally designed to contain a word having a number of digits in excess of that required by the input value $x$ whereby the subsequent complemented difference $(x_B-x)$ may be carried out to include more digits than the initial value of the input quantity $x$. Similarly, the register C was made extra long to accommodate a multiplicand quantity and the register D was made extra long to accommodate a product quantity. In each case the initial values of $x_A$ and $f(x_B)$ respectively were inserted at intermediate points ahead of the normal input point.

During the first major operation, the register B passes successive digits to selectively set the flip-flop 60. While the complemented form from the "0" output of the flip-flop 60 is passed through the gates 61 and 62 to the adder 22, the true form from the "1" output of the flip-flop 60 is passed via a lead 65 through an AND gate 66 and an OR gate 67 to a first input of the adder 23. Simultaneously, the digits representative of $x_A$ are passed from the register C through an AND gate 68 and an OR gate 69 to selectively set a flip-flop 70; and the complemented form of $x_A$ is passed from the "0" output of the flip-flop 70 via an AND gate 71 and an OR gate 72 to the second input of the adder 23. The sum signal from the adder 23 is therefore representative of the quantity $(x_B-x_A)$ and is passed via a lead 73, and AND gate 74 and an OR gate 75 to the input of the register B. Thus, at the end of the first major step, the register A will contain the difference value $(x-x_A)$ in complemented form, the register B will contain the difference value $(x_B-x_A)$ in true form and the registers D and E will continue to retain the values of $f(x_B)$ and $f(x_A)$ respectively.

During the next sub-cycle of operation timed shift pulses are applied to all five registers A, B, C, D and E, the division process is started by the adder 22, and another subtraction is performed by adder 23. The register A passes successive digits of the complemented form of the quantity $(x-x_A)$ to selectively set the flip-flop 58 whereupon these digits are passed through the AND gate 59 to the first input of the adder 22. Simultaneously, the quantity $(x_B-x_A)$ is passed from the register B to selectively set the flip-flop 60, and the true form of this quantity is passed via the lead 65, an AND gate 76 and an OR gate 62 to the second input of the adder 22. The sum output from the adder 22 is passed through an AND gate 63 to the register A which now constitutes the dividend register. The true form of the quantity $(x_A-x_B)$ is passed from the flip-flop circuit 60 through an AND gate 77 and the OR gate 75 to the input of the register B which now constitutes the divisor register.

During this same sub-cycle of operation, successive digits of the quantity $f(x_B)$ are passed from the register D to selectively set a flip-flop 79 which passes the $f(x_B)$ signal in the true form through the OR gate 67 to the first input of the adder 23. Simultaneously, successive digits of the quantity $f(x_A)$ are passed from the register E to selectively set a flip-flop 80, and the complemented form of the digits are passed from the "0" output of the flip-flop 80 through an AND gate 81 and the OR gate 72 to the second input of the adder 23. The difference quantity $f(x_B)-f(x_A)$ is developed at the sum output of the adder 23 and is passed via the lead 73, an AND gate 82 and an OR gate 83 to the input of the register C which now constitutes a multiplicand register. During this sub-cycle of operation an AND gate 84 has been rendered non-conductive, and since the AND gate 50 (FIGURE 4) is likewise non-conductive the register D receives no input signals, and is therefore cleared to contain only "0" bits. The register D now constitutes the product register, and it is cleared prior to the multiplication operation. During this sub-cycle of operation an AND gate 85 was rendered conductive such that the output from the register E was circulated via the flip-flop 80, the AND gate 85 and an OR gate 86 returning to the input of the register E.

At the end of this sub-cycle of operation the register A will contain the dividend quantity $(x-x_A)$ from the adder 22, the register B will contain the divisor quantity $(x_B-x_A)$ which was circulated, the register C will contain the multiplicand quantity $[f(x_B)-f(x_A)]$ from the adder 23. The register D will be cleared in preparation for storing the product in subsequent sub-cycles, and the register E will contain the quantity $f(x_A)$ which has been circulated.

During the next successive sub-cycles of operation, simultaneous steps of division and multiplication are performed—each step being similar to the others. A subtraction is performed by the adder 22 to obtain a binary quotient digit of "1" or "0" indicated by the presence or absence of a carry signal appearing at the lead 25. The contents of the multiplicand register C are selectively added to the contents of the product register D each time that the quotient digit appears as a "1." When the quotient digit appears as a zero the contents of the multiplicand register are blocked from the adder 23 by the AND gate 27, and effectively zeros are added to the product which is merely circulated through the adder 23 and again stored in the product register D. The register E merely retains the quantity $f(x_A)$ which is circulated via the flip-flop 80 and the gates 85 and 86.

The division operation is performed by the adder 22 by selectively adding or subtracting the divisor from the dividend and shifting the dividend in a manner substantially as described beginning on page 170 of a textbook entitled "Arithmetic Operations in Digital Computers" by R. K. Richards published in 1955 by the D. Van Nostrand Company. To determine whether the divisor is to be added or subtracted in a particular operation, the sign of the previous operation as indicated by the presence or absence of a carry signal on the lead 25 is sensed by a flip-flop circuit 88—the carry signal being passed by an AND gate 89 and an OR gate 90. In the event that no carry appears on the lead 25 after a particular sub-cycle operation of the adder 22, then the flip-flop circuit 88 will remain in a zero state having been reset by a previous timed pulse. On the other hand, if a carry signal appears on the lead 25 it is passed by the gates 89 and 90 and the flip-flop 88 is set in a "1" state. During the next subsequent operation sequential digits from the divisor signal will set the flip-flop 60, and the divisor in true form will be passed by the AND gate 76 or the divisor in complemented form will be passed by the AND gate 61 depending upon the state of the flip-flop 88. Thus, if no previous carry has appeared on the lead 25 the adder 22 will receive the true form of the divisor from the flip-flop 60 and a subtraction will be performed with the dividend quantity which is stored in complemented form in register A. If a previous carry has appeared on the lead 25, the adder 22 will receive the divisor in complemented form from the flip-flop 60 to perform an addition with the complemented multiplicand. Therefore, the steps of addition or subtraction are conducted by the adder in accordance with the previous determination of sign indicated by the presence or absence of a carry.

It may be appreciated that the presence or absence of a carry on the lead 25 represents a binary quotient digit resulting from the previous step of the division operation. When such a carry appears it will be stored by the flip-flop 26 which controls the next subsequent multiplication operation. Thus, when a carry appears on the lead 25, the gate 27 will pass the multiplicand from register C via the flip-flop 70 which will also be passed by the OR gate 72 to the second input of the adder 23. Simultaneously, a product will be formed in the register D, since the contents of this register will pass via the flip-flop 79 and the gate 67 to the first input of the adder 23. The sum signal from the adder 23 will be passed via the lead 73 and the AND gate 84 to be returned to the product register D. In the event no carry will appear on the lead 25, the gate 27 will block the multiplicand signal from the register C and the product signal from the register D will pass through the adder 23 and be returned to the register D with an effective addition of zeros.

As indicated above, further steps of the division and multiplication will continue essentially as described heretofore. Upon completion of the multiplication steps the final product will be stored in the register D, and one further step of addition will be required to complete the computation of the interpolation formula. The final step of addition will coincide with the next successive transfer operation wherein the gates 47, 48, 49, 50 and 51 (FIGURE 4) will be conditioned to pass signals into the registers A, B, C, D and E. Meanwhile the product from the register D will pass via the flip-flop 79 and the OR gate 67 to the first input of the adder 23 while the quantity $f(x_A)$ will pass from the register E via a flip-flop 80, a gate 92 and the OR gate 72 to the second input of the adder 23. The sum signal generated by the adder 23 is passed by the AND gate 53 to a final output terminal.

Referring again to the interpolation formula $$\frac{(x-x_A)}{x_B-x_A}[f(x_B)-f(x_A)]+f(x_A)=f(x)$$

and to the relative values of the input quantities $$x_A \leqq x < x_B$$

it may become apparent that the dividend quantity $(x-x_A)$ and the divisor quantity $(x_B-x_A)$ will always be positive in value and that the quotient $$\frac{x-x_A}{x_B-x_A}$$

will always be a positive fractional quantity. On the other hand, the multiplicand quantity $[f(x_B)-(fx_A)]$ may be either positive or negative depending upon the slope of the function curve. Obviously, the sign of the multiplicand quantity will determine the sign of the product and the final step must be an addition or a subtraction depending upon the sign of the multiplicand quantity. In the first sub-cycle of step 2 the quantity $f(x_B)$ from the register D is added to the complement of the quantity $f(x_A)$ from the register C, and the sum generated by the adder 23 is stored in the register C as the multiplicand. In the event that the multiplicand quantity is negative, the complement of this quantity will be stored in the register C, and a carry signal will appear on a lead 94. The carry signal will be passed by an AND gate 95 and will set a flip-flop circuit 96. The flip-flop circuit 96 will generate a voltage level at its "1" output lead which will be passed by an AND gate 97 and an OR gate 69 to set the flip-flop circuit 70. The flip-flop circuit 70 will generate a "1" signal which will be passed via a lead 98 through an AND gate 99 and the OR gate 83 to the input of the multiplicand register C. As the multiplicand register C is shifted, a series of "1" bits are entered to fill that register to complete the complementing operation which was initiated by the adder 23. With each shift pulse of the register C the flip-flop 70 will be reset, however, since the voltage level will remain at the "1" output terminal of the flip-flop 96, the flip-flop 70 will continue to be set prior to each shift operation. In the event that the multiplicand quantity $$[f(x_B)-(f(x_A)]$$

is positive, the true form will be entered into the multiplicand register C, and no carry signal will appear on the lead 94. In this event neither the flip-flop 96 nor the flip-flop 70 will be set and as the register C is shifted subsequent to the entry of the positive multiplicand a series of "0" bits will fill the register, providing a proper multiplicand in true form. The multiplicand quantity which is stored in the register C will therefore be in true form when the quantity $[f(x_B)-f(x_A)]$ proves to be positive; and will be in complemented form when the quantity $[f(x_B)-f(x_A)]$ proves to be negative.

The product results from selective addition and shifting of the multiplicand. If the multiplicand is in true form, the final product will likewise prove to be in true form; however, if the multiplicand is in complemented form, the final product will likewise be in complemented form. The multiplication process will be valid regardless of whether the multiplicand and final product are in true form or whether they are in complemented form. The final output signal $f(x)$ is obtained by combining the quantity $f(x_A)$ which is stored in the register E with the product quantity which is stored in the register D. If the product is positive, the contents of the two registers D and E should be added to obtain the final sum $f(x)$. Similarly, if the product quantity is negative it should be subtracted from the quantity $f(x_A)$ and this may be accomplished by adding the quantity $f(x_A)$ to the complemented product quantity. Therefore, it may be appreciated that as a final step to obtain the output quantity, $f(x)$, the contents of the register D may be added to the contents of the register E regardless of the fact that the product quantity may be negative and in complemented form.

The mathematical operations of addition and subtraction by the addition of a complemented number are well-known and will not be discussed herein. Division by selective addition or subtraction and the shifting of a divisor quantity is substantially disclosed in the Richards text "Arithmetic Operations in Digital Computers," supra, is performed as shown below:

Example: 11/13=.84615=.110110001=1011/1101
2's complement of divisor is 10011

```
                 0.110110001
                 ------------
                 1011.000000000
 -               0011
                 ----
       NC        11100
 +               01101
                 -----
       C         010010
 -                10011
                  -----
       C          001010
 -                 10011
                   -----
       NC          111010
 +                  01101
                    -----
       C            001110
 -                   10011
                     -----
       C             000010
 -                    10011
                      -----
       NC             101010
 +                     01101
                       -----
       NC              101110
 +                      01101
                        -----
       NC               110110
 +                       01101
                         -----
       C                 00011
 -          . . .
```

The above example is a binary division of the numbers representative of eleven and thirteen. The dividend in true form is 1011. The true form of the divisor is 1101, and the 2's complement of the divisor is 0011. Additions are performed by adding the true form of the divisor to the dividend, and subtractions are performed by adding the complemented form. After each addition or subtraction the divisor is column shifted to the right such that the next operation will be displaced by one digit. As shown above the initial operation is a subtraction (addition of the complement) and no carry (NC) appears in the result. Because no carry appeared the first digit of the quotient is a zero and the next operation will be that of addition. Thus, we may note that the true form of the divisor, 1101, is added at step 2. This step results in a carry indicating that the next most significant digit of the quotient is a one and further demanding that the next operation must be a subtraction. Further steps of addition or subtraction together with a shift operation continue throughout the division process whereby the quotient is developed digit by digit as each operation is performed. The most significant digit of the quotient is generated by the first subtraction, and the digits of lesser significance are thence forth generated with each subsequent addition or subtraction.

The process of multiplication as taught by this invention provides that a multiplicand quantity in either true form or complemented form is column shifted right and selectively added to a product quantity in repeated operations in response to the digits of a multiplier quantity. The digits of the multiplier are used to control successive addition steps in the order of significance with the most significant digit of the multiplier being first. Since the multiplication process is controlled by the multiplier digits in order of significance, it is possible to perform a simultaneous division and multiplication by using the quotient digits as generated from the division process to directly control the steps of multiplication without intermediate storage and time lag. An example of multiplication as taught by this invention is as follows:

Example: ±13×11=±143
Multiplicand: 1101 (True Form)
0011 (Complemented Form)
Multiplier: 1011

| | True Form | Multiplier Digits | Complemented Form |
|---|---|---|---|
| 1. Product Register Cleared | 00000000 | | 00000000 |
| 2. 1st Addition | 1101000 | 1 | 10011000 |
| 3. 1st Partial Product | 01101000 | | 10011000 |
| 4. 2nd Addition | 000000 | 0 | 000000 |
| 5. 2nd Partial Product | 01101000 | | 10011000 |
| 6. 3rd Addition | 11010 | 1 | 11100110 |
| 7. 3rd Partial Product | 10000010 | | 01111110 |
| 8. Final Addition | 1101 | 1 | 11110011 |
| 9. Final Product | 10001111 | | 01110001 |

The multiplicand may be a positive quantity which will appear in true form or a negative quantity which will appear in complemented form. On the left side of the above example, it is assumed that the multiplicand quantity is a positive 13 or 1101 in binary form. The first line is shown as zeros indicating the condition of the product register at the beginning of the multiplication operation. The second line indicates the multiplicand as it will be added to the product during the first and most significant addition, and the third line indicates the condition of the product register after the addition. The multiplicand is then shifted for the next operation, but since the next digit of the multiplier is zero, zeros are added at line 4 to leave the product unaffected as shown in the fifth line. In the next step, the multiplicand is again shifted to the right and is added since the multiplier digit appears as a one, and a new partial product is developed (line 7). In the final step the multiplicand is shifted again (line 8) and added to produce a final product of 10001111 which is the true form of the product 143.

If the multiplicand 13 is negative, it will appear in the 2's complement form, 0011, as indicated by the right column of the above example. The operations of successive selective additions and column shifting are similar to the operations in true form, and the final product generated appears as 01110001 which is the 2's complemented form of 143. It will be appreciated that in complemented form the multiplicand must be preceded by one digits rather than zero digits as in the true form. Thus, in the penultimate line of the example above, the complemented multiplicand 0011 in the right column is preceded by four one digits. In the left column, the true form of the multiplicand 1101 is shown with no preceding digits, however, by implication, zeros are presumed to precede the true form binary numbers.

As indicated previously, the solution of the interpolation formula involves a division between two quantities both of which are known to be positive, and wherein the divisor is greater than the dividend such that the quotient will be a positive fractional quantity. Obviously, this division may be carried out to any desired number of binary digits. By carrying the division and the subsequent multiplication to a greater number of binary places a greater degree of accuracy is achieved, but a greater period of time is required for the computation. In a particular application of this invention the input quantities $x$, $x_A$, $x_B$, $f(x_A)$ and $f(x_B)$, were 12 binary digits in length, and to achieve an accuracy of plus or minus one binary digit in the 12th place of the output quantity $f(x)$, it was necessary to carry the quotient out to 15 binary digits and to provide a product register capable of storing 16 binary digits. However, a round-off was achieved using 12 successive addition/subtraction operations of the division process, and a corresponding 12 selective addition operations of the multiplication process.

In accordance with this invention, an interpolation computation could be achieved serially in a minimum of time with an accuracy of 11 binary places. This accuracy amounts to about .05% error or one part in 2,000 which exceeds the accuracy of ordinary analog methods. This invention provides another important feature in that a determination may be made of a function of two or more variables by an interpolation process applied to a first family of curves to obtain new curves of fewer variables for subsequent interpolations, etc. Thus, by repeated interpolations, each family of curves may be reduced to other curves of fewer variables until a final result is obtained.

The curves of FIGURE 2 are shown with points spaced equally along the abscissa, and with corresponding points of the various curves of the family being spaced one above the other. In the operation of this invention such a uniformity of spacing of the curve points is unnecessary, and the value of a function may be derived from stored data representative of curve points which have no uniformity in spacing and wherein the points of various curves do not have similar locations along the abscissa.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Computing apparatus for performing combined functions of division and multiplication upon three digital quantities each represented by serial input signals, said apparatus comprising a plurality of registers for storing the input signals, a first adder coupled to two of the registers for receiving a first of the digital quantities constituting a dividend and a second of the digital quantities constituting a divisor, said adder in combination with a register being adapted for successive subtractions and column shifting of the divisor for generating successive digits of a quotient signal wherein the most significant digit is generated first and said adder including further means for circulating said divisor as said successive bits are generated, and a second adder coupled to a third of the registers for receiving the third input signal constituting the multiplicand, said adder being operable to perform serially by digit directly as the digits are developed by said first adder successive selective additions of the multiplicand to generate a product signal, said second adder also including further means for circulating said multiplicand and column shifting of said product in accordance with said successive digits generated by said first adder the quotient signal from the first adder constituting a multiplier and coupled to control the selective additions of the multiplicand into the product signal whereby the multiplication is performed serially by bit of the multiplier wherein the most significant bit is used first.

2. Apparatus for computing the value of a function in accordance with the formula:

$$f(x)=\frac{x-x_A}{x_B-x_A}[f(x_B)-f(x_A)]+f(x_A)$$

where $x_A$ and $x_B$ are successive values of an independent variable represented by binary signals reproduced from storage, where $x$ is a quantity represented by an input signal, where $f(x_A)$ and $f(x_B)$ are values of the function corresponding with the $x_A$ and $x_B$ and are reproduced from storage, and where $f(x)$ corresponds to the desired value of the function to be represented by an output signal; said apparatus comprising five registers for receiving the signals representing $x$, $x_A$, $x_B$, $f(x_A)$ and $f(x_B)$; a first adder and a second adder; each of said adders including further means for circulating said divisor as said successive bits are generated; selective gating means coupled between the registers and the adders; and timing means controllably associated with the gating means; said gating means being operable to pass the signals representative of $x$, $x_A$ and $x_B$ to the adders during an initial timed step whereby difference signals representative of $(x-x_A)$ and $(x_B-x_A)$ are generated by the adders and stored in respective registers; the first adder being operable during successive timed intervals to perform a division of the quantities $(x-x_A)$ and $(x_B-x_A)$; the second adder being operable to perform a subtraction of the quantities $f(x_B)$ and $f(x_A)$ to obtain a quantity $[f(x_B)-f(x_A)]$ and thence being further operable to perform successive selection additions of the quantity $[f(x_B)-f(x_A)]$ as a multiplicand in accordance with a quotient signal developed by the first adder serially by digit directly as the digits are developed by said first adder whereby each successive step of multiplication is controlled by each successive multiplier digit being generated by the first adder, and a further adder operable to combine the value $f(x_A)$ to thereby provide the value of said function in accordance with said formula.

3. Digital function generating apparatus comprising a storage means, a comparator and an arithmetic unit, said comparator being coupled to receive a digital input signal representative of an input quantity and being further coupled to the storage means for receiving a succession of digital signals representative of successive values of both independent and dependent variables which constitute points of a function curve, said comparator including means for comparing the input signal successively with the signals representative of the successive values of the independent variable of the function curve, said comparator further including register means for retaining the input signal, a pair of successive signals representative of bracketing values of the independent variable with respect to the input quantity, and a pair of signals representing successive values of the dependent variable corresponding to the bracketing values of the independent variable, said arithmetic unit including register means for receiving the signals retained by the register means of the comparator, said arithmetic unit further including adder and logic circuitry for generating a digital output signal in accordance with the formula:

$$f(x)=\frac{x-x_A}{x_B-x_A}[f(x_B)-f(x_A)]+f(x_A)$$

wherein $x$ is representative of the input quantity, $x_A$ and $x_B$ are representative of the bracketing values of the independent variables, $f(x_A)$ and $f(x_B)$ are representative of the values of the dependent variables corresponding with the bracketing values of the independent variables, and $f(x)$ is representative of the output quantity the interpolation between said bracketing values $x_A$ and $x_B$ including the initial steps of subtraction to obtain signals representative of a dividend quantity $(x-x_A)$, a divisor quantity $(x_B-x_A)$ and a multiplicand quantity $$f(x_B)-f(x_A)$$

said interpolation further including simultaneous steps of division and multiplication wherein signals representative of quotient digits are generated by the division steps and simultaneously used as multiplier digits in the multiplication step to develop a product signal, said interpolation step further including a final addition of the product signal and the function value $f(x_A)$.

4. Digital function generating apparatus in accordance with claim 3 wherein the arithmetic unit is coupled to pass digital signals to the storage means, said storage means including a section for permanent storage wherein are stored digital signals representative of successive values of functions of a plurality of independent variables, said storage means further including an intermediate storage section for receiving and storing digital signals from the arithmetic unit, said signals stored in the intermediate section being representative of successive values of functions obtained from operations of the arithmetic unit wherein at least one of the independent variables has been eliminated, both said permanent storage section and said intermediate storage section being coupled to the comparator whereby a succession of interpolations may be performed from the signals obtained from the permanent storage section to generate signals for the intermediate storage section, and whereby further interpolations may be performed upon the signals from the intermediate storage section to obtain final output signals.

References Cited by the Examiner

UNITED STATES PATENTS

| | | | |
|---|---|---|---|
| 2,580,768 | 1/1952 | Hamilton et al. | 235—153 |
| 2,636,672 | 4/1953 | Hamilton et al. | 235—61.6 |
| 2,860,241 | 11/1958 | Post | 235—195 X |
| 2,932,450 | 4/1960 | Knight et al. | 235—159 |
| 3,120,606 | 2/1964 | Eckert et al. | 235—160 |

ROBERT C. BAILEY, *Primary Examiner.*

WALTER W. BURNS, Jr., MALCOLM A. MORRISON, *Examiners.*

M. POKOTILOW, S. DAVID, M. A. LERNER, *Assistant Examiners.*